United States Patent
Jung et al.

(10) Patent No.: US 9,231,985 B2
(45) Date of Patent: Jan. 5, 2016

(54) SOURCE DEVICE, ROUTER AND CONTROL METHOD

(71) Applicant: SAMSUNG ELECTRONICS CO., LTD., Suwon-si (KR)

(72) Inventors: Bae-eun Jung, Seongnam-si (KR);
Myung-jin Eom, Gangseo-gu (KR);
Byoung-joon Lee, Seongnam-si (KR);
Myeong-wuk Jang, Hwaseong-si (KR);
Jae-hoon Kim, Yongin-si (KR);
Jae-sung Park, Gunpo-si (KR);
Young-il Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 168 days.

(21) Appl. No.: 14/036,903

(22) Filed: Sep. 25, 2013

(65) Prior Publication Data

US 2014/0086257 A1 Mar. 27, 2014

(30) Foreign Application Priority Data

Sep. 25, 2012 (KR) ........................ 10-2012-0106714

(51) Int. Cl.
*H04L 29/06* (2006.01)
*H04L 29/08* (2006.01)

(52) U.S. Cl.
CPC ........ *H04L 65/1069* (2013.01); *H04L 65/4084* (2013.01); *H04L 65/80* (2013.01); *H04L 67/2842* (2013.01)

(58) Field of Classification Search
CPC .................................................. H04L 65/1069
See application file for complete search history.

(56) References Cited

U.S. PATENT DOCUMENTS

| 7,277,911 | B2 |   | 10/2007 | Cheah |
| 7,281,058 | B1 | * | 10/2007 | Shepherd et al. ............. 709/238 |
| 7,516,322 | B1 | * | 4/2009 | Graham ........................ 713/160 |
| 7,734,913 | B2 | * | 6/2010 | Morino et al. ................ 713/161 |
| 7,797,383 | B2 |   | 9/2010 | Baird |
| 7,814,225 | B2 | * | 10/2010 | Rumelhart .................... 709/238 |
| 8,165,118 | B2 | * | 4/2012 | Stewart et al. ................ 370/389 |
| 8,386,622 | B2 | * | 2/2013 | Jacobson ...................... 709/229 |
| 8,416,688 | B2 | * | 4/2013 | Morris et al. ............. 370/230.1 |
| 8,762,570 | B2 | * | 6/2014 | Qian et al. .................... 709/241 |

(Continued)

FOREIGN PATENT DOCUMENTS

| KR | 1020070012678 A | 1/2007 |
| KR | 1020070031532 A | 3/2007 |
| KR | 1020110051725 A | 5/2011 |

OTHER PUBLICATIONS

International Search Report for PCT/KR2013/008534 dated Jan. 29, 2014 [PCT/ISA/210].

(Continued)

*Primary Examiner* — Rasheed Gidado
(74) *Attorney, Agent, or Firm* — Sughrue Mion, PLLC (57) ABSTRACT

A method of controlling a router to transmit Content-Centric Network (CCN)-based real-time contents is provided. The method includes receiving identification information regarding real-time contents that a target device is to receive from a source device and transmitting the real-time contents to the target device, and in response to content request information which is generated based on the identification information being received from the target device, transmitting to the target device contents which correspond to the received request information.

19 Claims, 9 Drawing Sheets

(56) References Cited

U.S. PATENT DOCUMENTS

| | | |
|---|---|---|
| 2005/0213557 A1 | 9/2005 | Hwang et al. |
| 2008/0168510 A1* | 7/2008 | Small et al. .................. 725/100 |
| 2009/0287835 A1 | 11/2009 | Jacobson |
| 2010/0061281 A1 | 3/2010 | Guichard et al. |
| 2011/0111776 A1 | 5/2011 | Kim et al. |
| 2012/0030297 A1 | 2/2012 | Levett |
| 2012/0158973 A1 | 6/2012 | Jacobson et al. |
| 2013/0097277 A1* | 4/2013 | Kim .............................. 709/217 |
| 2013/0132469 A1* | 5/2013 | Levicki et al. ................ 709/203 |
| 2013/0246631 A1* | 9/2013 | Gonzales et al. ............. 709/227 |

OTHER PUBLICATIONS

Written Opinion for PCT/KR2013/008534 dated Jan. 29, 2014 [PCT/ISA/237].

\* cited by examiner

PIT(Pending Interest Table)

| REQUEST INFORMATION (Interest Name) | STORAGE TIME(Lifetime) |
|---|---|
| | |
| | |
| | |
| | |

(CCT) Content Cache Table

| CONTENT NAME | STORAGE TIME(Lifetime) |
|---|---|
| | |
| | |
| | |
| | |

FIG. 7

PIT(Pending Interest Table)

| REQUEST INFORMATION (Interest Name) | STORAGE TIME(Lifetime) |
|---|---|
| /samsung/videochat/#TP | |
| | |
| | |
| | |

(CCT) Content Cache Table

| CONTENT NAME | STORAGE TIME(Lifetime) |
|---|---|
| /samsung/videochat/#1 | |
| /samsung/videochat/#2 | |
| /samsung/videochat/#3 | |
| ⋮ | |

SOURCE DEVICE, ROUTER AND CONTROL METHOD

CROSS-REFERENCE TO RELATED APPLICATIONS

This application claims priority from Korean Patent Application No. 10-2012-0106714, filed in the Korean Intellectual Property Office on Sep. 25, 2012, the disclosure of which is incorporated herein by reference, in its entirety.

BACKGROUND

1. Field

Aspects of the exemplary embodiments relate to a source device, a router, and a control method. More particularly, the exemplary embodiments relate to a source device based on a Content-Centric Network (CCN), a router, and a control method.

2. Description of the Related Art

Currently, an Internet structure may be designed based on one-to-one and host-to-host communication paradigms, but most internet usage is focused on data or contents rather than on a host. In other words, users are interested in data or contents rather than who has the data that they want.

Due to the above inconsistency between the Internet structure and the actual usage pattern, Internet users often go through unnecessary operations or procedures when they try to obtain desired data. To resolve this problem, CCN has been introduced to design intent based on a paradigm which focuses on contents. However, in response to real-time data transmission being required in a CCN-based system, such as in a video conversation, a target device may not know the name of the contents to be requested.

SUMMARY

An aspect of the exemplary embodiments relates to a source device in a CCN-based system, which is capable of transmitting contents on a real-time basis a router and a control method.

Another aspect of the exemplary embodiments relates to a source device which is capable of minimizing data flow when contents are transmitted on a real-time basis in a CCN-based system, a router and a control method.

A method for controlling a router to transmit Content-Centric Network (CCN)-based real-time contents according to an exemplary embodiment includes receiving identification information regarding real-time contents that a target device is to receive from a source device and transmitting the real-time contents to the target device and, in response to content request information which is generated based on the identification information being received from the target device, transmitting to the target device the contents which correspond to the received request information.

The identification information may include at least one of source device identification information, service identification information, target device identification information, group name and content name. In addition, the request information may include the source device identification information, the group name and the content name.

If the request information is information which identifies a packet group which includes a plurality of packets, the transmitting contents which correspond to the request information to the target device may include transmitting to the target device a plurality of packets included in a packet group which is identified by the request information.

The method may further include, in response to the request information being received, confirming whether contents which correspond to the request information are stored, and the transmitting contents corresponding to the request information to the target device may include, in response to the contents which correspond to the request information being stored, transmitting to the target device the stored contents.

The method may further include, in response to the request information being received, confirming whether contents which correspond to the request information being stored, and the transmitting contents which correspond to the request information to the target device may include, in response to contents which correspond to the request information not being stored, transmitting to the source device the received request information, and receiving from the source device contents which correspond to the request information and transmitting the contents to the target device.

The real-time contents may include video conversation contents.

A method of controlling a source device to transmit Content-Centric Network (CCN)-based real-time contents according to an exemplary embodiment may include generating real-time contents that a target device is to receive from a source device and transmitting the real-time contents to a router, and in response to request information for requesting contents being received from the router, transmitting content request information which is generated based on the identification information received from the target device, and transmitting to the target device contents which correspond to the received request information.

The identification information may include at least one of source device identification information, service identification information, target device identification information, group name, and content name. In addition, the request information may include the source device identification information, group name and content name.

In response to the request information being information which identifies a packet group including a plurality of packets, the transmitting contents, which correspond to the request information to the router, may include transmitting to the router a plurality of packets included in a packet group which is identified by the request information.

The identification information and the request information may be respectively broadcast from the source device and the target device.

A router for transmitting CCN-based real-time contents according to an exemplary embodiment includes an interface which performs communication with a device and a controller which receives identification information regarding real-time contents that a target device is to receive from a source device, transmits the received identification information to the target device, and in response to the request information for requesting the real-time contents being received from the target device, controls the interface to transmit to the target device the contents which correspond to the received request information.

The identification information may include at least one of source device identification information, service identification information, target device identification information, group name and content name. In addition, the request information may include the source device identification information, group name and content name.

In response to the request information being information which identifies a packet group including a plurality of packets, the controller may transmit to the target device a plurality of packets included in a packet group which is identified by the request information.

In response to the request information being received, the controller may confirm whether contents which correspond to the request information are stored. In response to contents which correspond to the request information being stored, may transmit the stored contents to the target device.

In response to request information being received, the controller may confirm whether contents which correspond to the request information are stored, and in response to contents which correspond to the request information not being stored, the controller may transmit to the source device the received request information, receive contents which correspond to the request information from the source device and may transmit the contents to the target device.

The identification information and the request information may be respectively broadcast from the source device and the target device.

A source device for transmitting CCN-based real-time contents according to an exemplary embodiment includes an interface which performs communication with a router, an identification information generator which generates identification information which identifies real-time contents that a target device is to receive, and a controller which transmits the generated identification information to the router, and in response to request information which requests contents being received from the router, controls the interface to transmit to the interface unit contents which correspond to the received request information.

The identification information may include at least one of source device identification information, service identification information, target device identification information, group name and content name. In addition the request information may include the source device identification information, group name and content name.

In response to the request information being information which identifies a packet group including a plurality of packets, the controller may transmit to the router a plurality of packets included in a packet group which is identified by the request information.

The real-time contents may be video conversation contents.

According to the various exemplary embodiments, real-time contents may be transmitted efficiently in a CCN-based system.

In addition, real-time contents may be continuously received according to a transmission of request information including a plurality of packets. Thus, overhead and degradation of performance may be prevented on a network and limited PIT resources may be efficiently used.

An exemplary embodiment may provide a system for transmitting CCN-based real-time contents, the system including: a router configured for communication with an interface and a target device; the router including a controller which receives through an interface a request including identification information from a source device and transmits the identification information to the target device; and the router receiving content information in response to the request for identification information, and controlling the interface to transmit the received contents to the target device. The received content information may include real-time contents. The identification information may include at least one of source device identification information, service identification information, target device identification information, group name and content name. In addition, the received content information may be stored within a storage device in the router.

BRIEF DESCRIPTION OF THE DRAWINGS

The above and/or other aspects of the inventive concept will be more apparent by describing certain exemplary embodiments with reference to the accompanying drawings, in which.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without or in addition to those specifically defined matters. Also, well-known functions or constructions are not described in detail since they would obscure the application with unnecessary detail.

Figure 1:
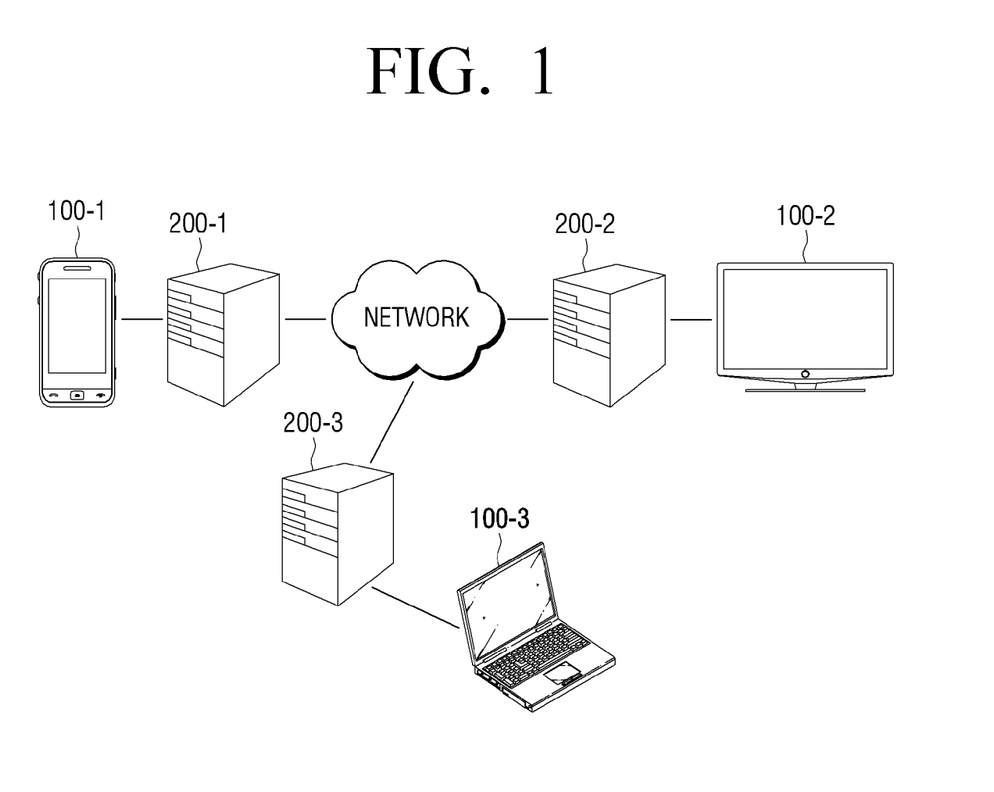
FIG. 1 is a view illustrating a CCN-based video conversation system according to an exemplary embodiment.

FIG. 1 is a view illustrating a CCN-based video conversation system according to an exemplary embodiment. According to FIG. 1, a CCN-based real-time content transmission system comprises a plurality of terminal devices 100-1, 100-2, 100-3 and a plurality of routers 200-1, 200-2, 200-3. The plurality of terminal devices 100-1, 100-2, 100-3 may be connected to each other on a network through the routers 200-1, 200-2, 200-3. The exemplary embodiments are not limited to the number or type of illustrated terminals or routers.

Each terminal device of the CCN-based network system may request specific content by transmitting a request information (or interest information) which includes the name of the contents to be received.

The request information may be broadcast and transmitted to various devices (for example, various terminals, routers, etc.) on a network or through a plurality of networks. A device (a source device) which contains the contents which correspond to the request information on a network may transmit the contents through the use of a path through which the request information has been received, in response to the received request information (or interest information).

The plurality of terminal devices 100-1, 100-2, 100-3 may be implemented as various apparatuses such as a TV, mobile phone, PDA, notebook PC, monitor, tablet PC, electronic book, electronic album, kiosk, etc.

The router 200 may not only connect each network but may also store and manage request information and contents which are transmitted on a network. Specifically, the request information and contents which are transmitted through the router 200 may be stored in the router 200, and in response to a lapse of a predetermined time, the stored request information and contents may be deleted.

In response to the requested information being received, the router 200 checks whether the contents which corresponds to the received request information is stored in the router 200, and in response to a determination that the router 200 stores the requested contents, the router 200 may transmit the contents to a terminal device which transmitted the request information. That is, the source device does not transmit the same contents repeatedly on a network and instead, transmits the contents to a router which is nearest to the terminal device which requested the contents, thereby reducing the amount of data and preventing delay in transmission of data.

Meanwhile, in response to real-time contents transmission being required in a case such as a video conversation, each of the terminal devices 100-1, 100-2, 100-3 may not have any advance information regarding the contents to be received. Accordingly, each of the terminal devices 100-1, 100-2, 100-3 may generate identification information regarding contents that it will generate on a real-time basis, and may transmit the generated identification information to terminal devices which participate in the video conversation, thereby transmitting information to each terminal device regarding the contents to be received. For example, when requesting video conversation or permitting video conversation, each terminal device may also transmit to another terminal device identification information regarding the contents that it will generate on a real-time basis.

The identification information may be transmitted according to a broadcasting method. Accordingly, a terminal device on a network may check the destination of the request information using the identification information of a device included in request information.

Meanwhile, information regarding a video conversation group and video and audio codec information of real-time contents may be shared through a Session Description Protocol (SDP).

A terminal device receiving identification information may generate and transmit request information (or interest information) for requesting contents based on the identification information, and may receive the real-time contents in response to the request information. The request information may include identification information, group names and content names of a source device in order to identify the real-time contents to be received.

The identification information and the request information may be transmitted to each device on a network by being broadcast on a network since the destination address is not known due to the characteristics of a CCN-based network.

Figure 2:
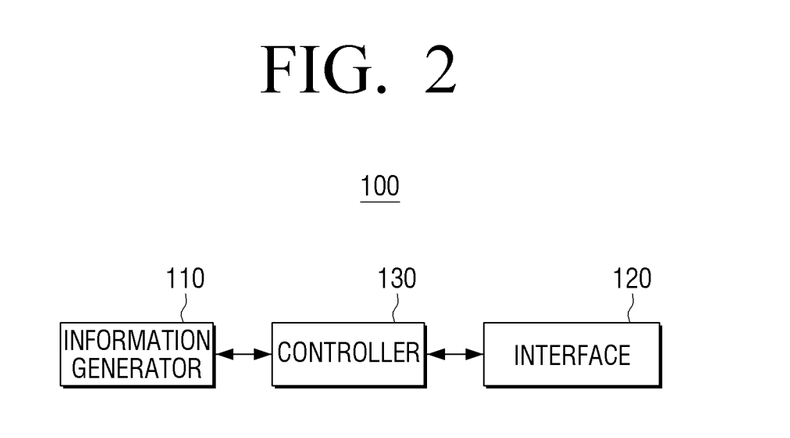
FIG. 2 is a block diagram illustrating a configuration of a terminal device according to an exemplary embodiment.

FIG. 2 is a block diagram illustrating a configuration of a terminal device according to an exemplary embodiment. Referring to FIG. 2, a terminal device 100 comprises an information generator 110, an interface 120, and a controller 130.

The information generator 110 generates identification information regarding real-time contents that a target device receives. As illustrated in FIG. 1 with respect to a CCN-based network, in order to transmit real-time contents such as a video conversation, it is necessary to inform a terminal device which receives the contents, that is, a target device, of information regarding the contents that it will receive.

Accordingly, the information generator 110 may generate at least one of source device identification information, service identification information, target device identification information, group name and content name as identification information regarding the real-time contents that a target device will receive.

The source device identification information is information which identifies a source device, and may be an inherent ID of a source device, an ID of users who participate in a video conversation through the source device, etc. The service identification information represents the type of applications which are provided on a real-time basis, and in the case of a video conversation, may be information representing the video conversation. The target device identification information may be information which identifies a target device, and may be an ID of users who participate in a video conversation through the target device. The group name is information which identifies the name of groups which wish to participate in a video conversation, and the content name is information which identifies the name of contents which a target device will receive, i.e., the name of contents that a source device generates on a real-time basis.

The interface 120 communicates with a router 200. That is, the interface 120 may allow the terminal device 100 to communicate with another device on a network through the router 200. Specifically, the interface 120 may transmit/receive identification information, request information and contents to/from the router 200.

The controller 130 controls overall operations of the terminal device 100. Specifically, the controller 130 may control the information generator 110 and the interface 120 to allow transmission of contents on a real-time basis.

In particular, the controller 130 may transmit identification information generated by the information generator 110 to the router 200, and in response to request information for requesting real-time contents being received from the router, may transmit to the router the contents which correspond to the received request information.

In response to request information being received through the interface 120, the controller 130 may transmit to the router 200 the real-time contents which correspond to the request information so that a target device requesting the real-time contents may receive the contents. Herein, in response to the request information not being information which identifies contents by packet but information to identify packet groups including a plurality of packets, the controller may transmit a plurality of packets included in a packet group which is identified by the request information to the router, which will be explained in greater detail with reference to FIG. 7.

Figure 3:
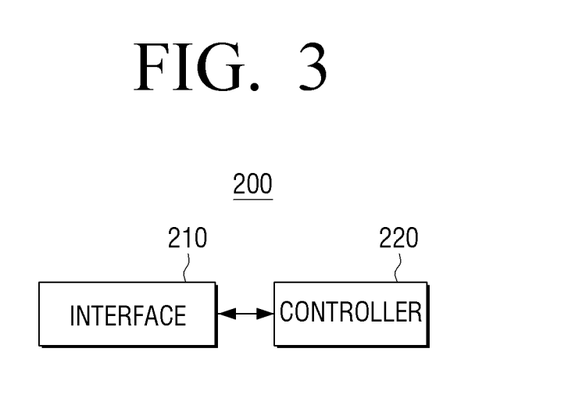
FIG. 3 is a block diagram illustrating a router configuration according to an exemplary embodiment.

FIG. 3 is a block diagram illustrating a configuration of a router according to an exemplary embodiment. According to FIG. 3, the router 200 comprises an interface 210 and a controller 220.

The interface 210 communicates with various devices on a network. Specifically, the interface 210 may transmit/receive identification information, request information, contents, etc. to/from various devices on a network.

The controller 220 may control the interface 210 to receive identification information regarding real-time contents which a target device will receive from a source device and may transmit the identification information to the target device.

In addition, in response to request information for requesting real-time contents being received from a target device, the controller 220 may control the interface 210 to transmit to the target device the contents which correspond to the received request information.

Herein, the router 200 may further comprise a storage device (not shown) which stores request information and contents which correspond to the request information, a Pending Interest Table (PIT) to manage stored request information and a Content Cache Table (CCT) to manage received contents.

Specifically, in response to request information being received from a target device, the controller 220 may store the received request information in a PIT. The request information which is broadcast on a network may be transmitted to the router 200 through a plurality of paths, and in this case, the request information, except for the initially-received request information, may not be stored in a PIT and may be dropped.

In addition, in response to contents which correspond to request information being received from a source device, the controller 220 may store the received contents in a storage device (not shown) and may store the contents in a Content Cache Table (CCT).

In response to request information being received, the controller 220 may check whether the contents which correspond to the request information being stored by checking a PIT and a (CCT). In response to the contents which correspond to the request information being stored, the controller 220 may not store the received request information in another device and may transmit the stored contents to a target device using a path through which the request information was received.

In response to the contents which correspond to the request information not being stored, the controller 220 may store the received request information, transmit the request information to another device, receive and store contents which correspond to request information, and may transmit the information to a target device.

Meanwhile, the request information and the contents stored in a PIT and a (CCT) may be deleted automatically in response to a lapse of a predetermined storage time. The PIT and the (CCT) will be explained in greater detail with reference to FIGS. 6 and 7.

Figure 4:
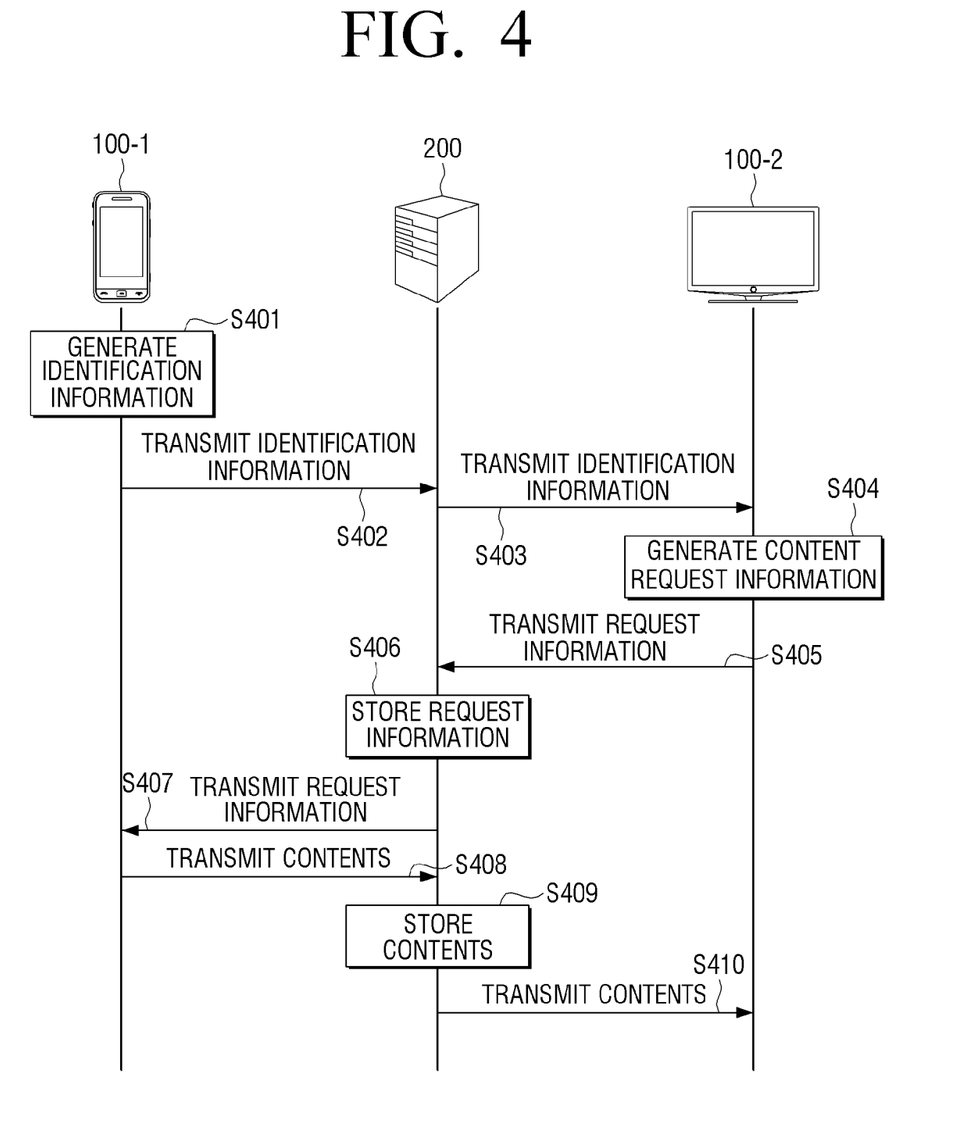
FIG. 4 is a sequence view provided to explain a CCN-based video conversation system according to an exemplary embodiment.

FIG. 4 is a sequence view provided to explain a CCN-based video conversation system according to an exemplary embodiment. In particular, FIG. 4 illustrates that a source device generates identification information regarding real-time contents and transmits the generated identification information to a target device. A plurality of routers may exist between the source device 100-1 and the target device 100-2; however, for convenience of explanation, it is assumed that information and contents are transmitted via a single router.

The source device 100-1 generates identification information (S401). Herein, the identification information may include at least one of source device identification information, service identification information, target device identification information, group name, and content name. The generated identification information is transmitted to the router 200 (S402). The identification information is transmitted using a broadcasting method and thus, the identification information may be transmitted to another device which is connected not only to the router 200 but also to the source device 100-1 on a network.

The router 200 transmits identification information received from the source device 100-1 to the target device 1002 (S403). The target device 100-2 which receives the identification information may recognize that the received identification information is destined to the target device 100-2 itself using the identification information of the target device included in the identification information, and accordingly, the target device generates request information for requesting real-time contents based on the received identification information (S404), and transmits the generated request information to the router 200 (S405). Herein, the request information is transmitted using a broadcasting method and thus, the request information may be transmitted to another device which is connected not only to the router 200 but also to the target device 100-2 on a network.

After receiving the request information from the target device 100-2, the router 200 stores the received request information (S406). Specifically, the router 200 may store and manage the request information in a PIT. Subsequently, the router 200 transmits the request information to peripheral devices including the source device 100-1 (S407).

After receiving the request information from the router 200, the source device 100-1 checks whether the source device 100-1 has contents which correspond to the request information, and transmits to router 200 the contents which correspond to the request information (S408).

After receiving the contents from the source device 100-1, the router 200 stores the received contents (S409), and transmits the received contents to the target device 100-2 (S410). That is, the source device 100-1 may transmit to the target device 100-2 the contents which correspond to the request information using a path through which the request information was received.

Figure 5:
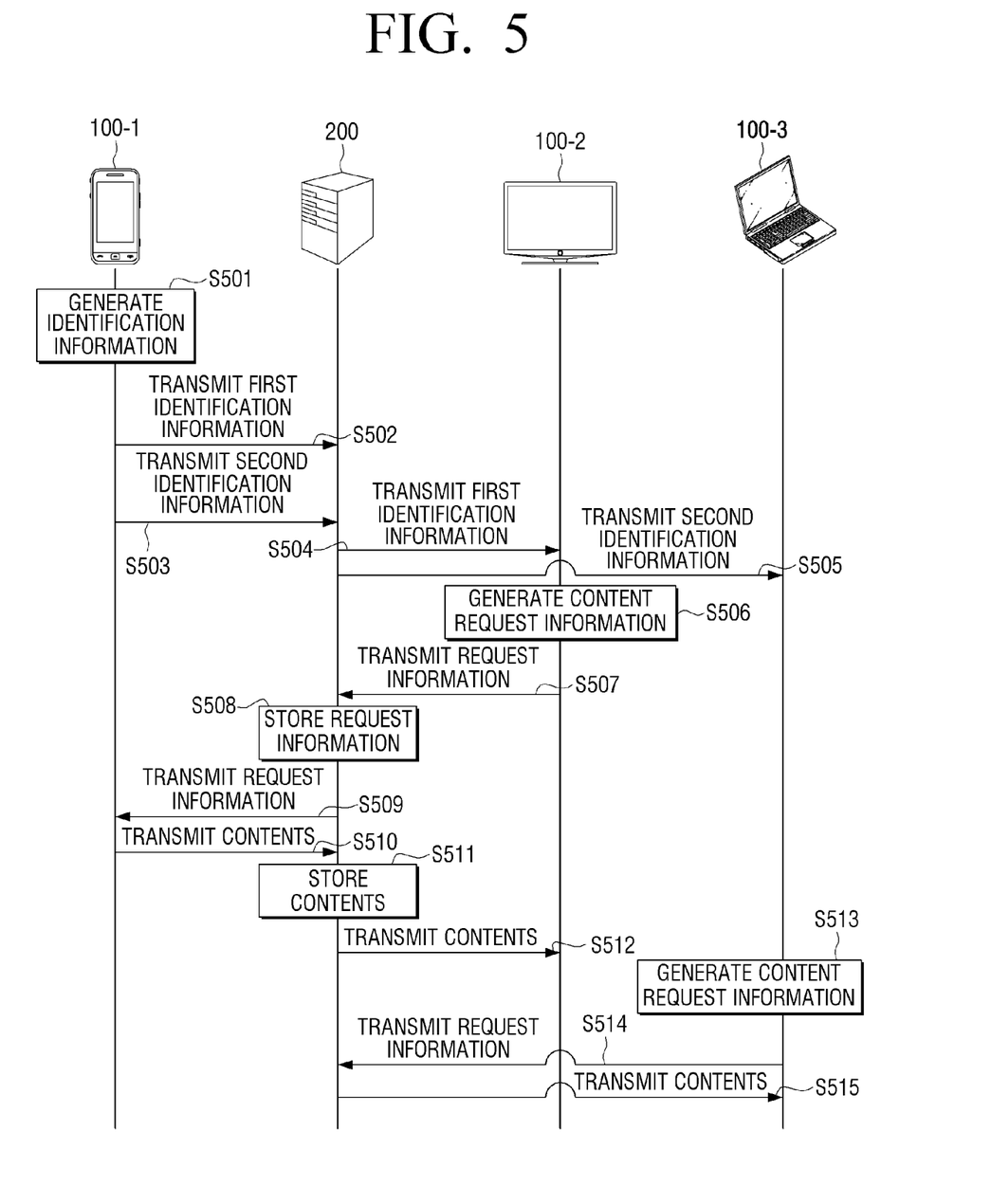
FIG. 5 is a sequence view provided to explain a CCN-based video conversation system according to another exemplary embodiment.

FIG. 5 is a sequence view provided to explain a CCN-based video conversation system according to another exemplary embodiment. In particular, FIG. 5 explains a case where the router 200 stores contents which corresponds to request information. A plurality of routers may exist between the source device 100-1 and the target device 100-2, 100-3, but it is assumed for convenience of explanation that information and contents are transmitted via a single router.

The source device 100-1 generates identification information (S501). Herein, the identification information may include at least one of source device identification information, service identification information, a target device identification information, group name and content name. The source device 100-1 may respectively generate first identification information and second identification information regarding a first target device and a second target device. The first identification information and the second identification information are different from each other in terms of identification information regarding target devices.

Subsequently, the generated first and the second identification information are transmitted to the router 200 (S502, S503). The identification information is transmitted using a broadcasting method and thus, the identification information may be transmitted to another device which is connected not only to the router 200 but also to the source device 100-1 on a network.

The router 200 transmits the first identification information and the second identification information received from the source device 100-1 to the first target device 100-2 and the second target device 100-3, respectively (S504, S505).

The first target device 100-2 which receives the first identification information may recognize that the received identification information is destined to the target device 100-2 itself, using the identification information of the target device included in the identification information and accordingly, generates request information for requesting real-time contents based on the received identification information (S506), and transmits the generated request information to the router 200 (S507). Herein, the request information is transmitted using a broadcasting method and thus, the request information may be transmitted to another device which is connected not only to the router 200 but also to the first target device 100-2 on a network.

After receiving the request information from the first target device 100-2, the router 200 checks whether the received request information is stored in a PIT, and in response to the received request information being newly-received request information, stores the received request information (S508). Specifically, the router 200 may store and manage the request information in a PIT. Subsequently, the router 200 transmits the request information to peripheral devices including the source device 100-1 (S509).

After receiving the request information from the router 200, the source device 100-1 checks whether the source device 100-1 has contents which correspond to the request information, and transmits to the router 200 the contents which correspond to the request information (S510).

After receiving the contents from the source device 100-1, the router 200 checks a (CCT) to determine whether the contents are newly-received, and upon a determination being made that they are newly-received contents, the router stores the received contents (S511), and transmits the received contents to the target device 100-2 (S512). That is, the source device 100-1 may transmit the contents which corresponds to the request information to the target device 100-2 using a path through which the request information was received.

Meanwhile, the second target device 100-3 which receives the second identification information may recognize that the received identification information is destined to the target device 100-2 itself using the identification information of the target device included in the identification information, and accordingly, generates request information for requesting real-time contents based on the received identification information (S513), and transmits to the router 200 the generated request information (S514). The request information is transmitted using a broadcasting method and thus, the request information may be transmitted to another device which is connected on a network not only to the router 200 but also to the second target device 100-2.

After receiving the request information from the second target device 100-2, the router 200 checks whether the received request information is stored in a PIT, and in response to the received request information being stored in the PIT, checks whether contents which correspond to the request information are stored in a (CCT). In response to the contents which correspond to the request information being stored, the request information is not transmitted to the source device 100-1 and instead, the stored contents which correspond to the request information are transmitted to the second source device 100-3 (S515).

Figure 6:
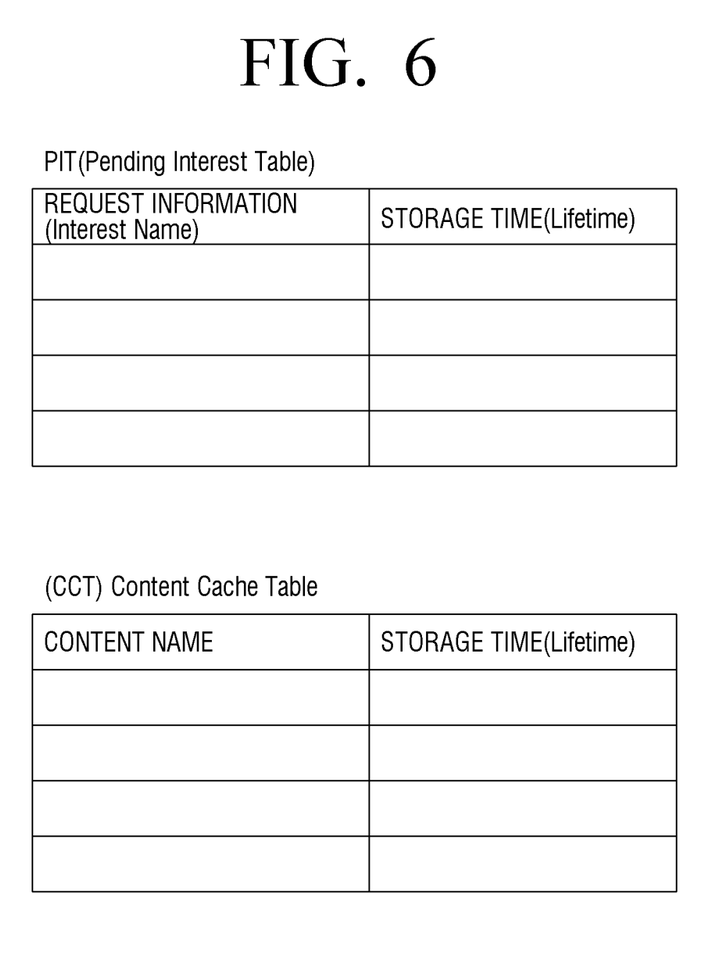
FIG. 6 is a view provided to explain a PIT and a Content Cache Table of a router according to an exemplary embodiment.

FIG. 6 is a view provided to explain a PIT and a (CCT) of a router, according to an exemplary embodiment.

The PIT may include a request information field (interest name) and a storage time field (lifetime). The request information field is a field which stores request information that the router 200 receives, or stores content names included in the request information. The storage time field may include information regarding how long the request information or the content name stored in a PIT will be maintained.

The (CCT) may include a content name field and a storage time field (lifetime). The content field is a field which stores the content name which the router 200 receives and stores, and the storage time field is a field which includes information regarding how long the request information or the content name stored in a PIT will be maintained.

Figure 7:
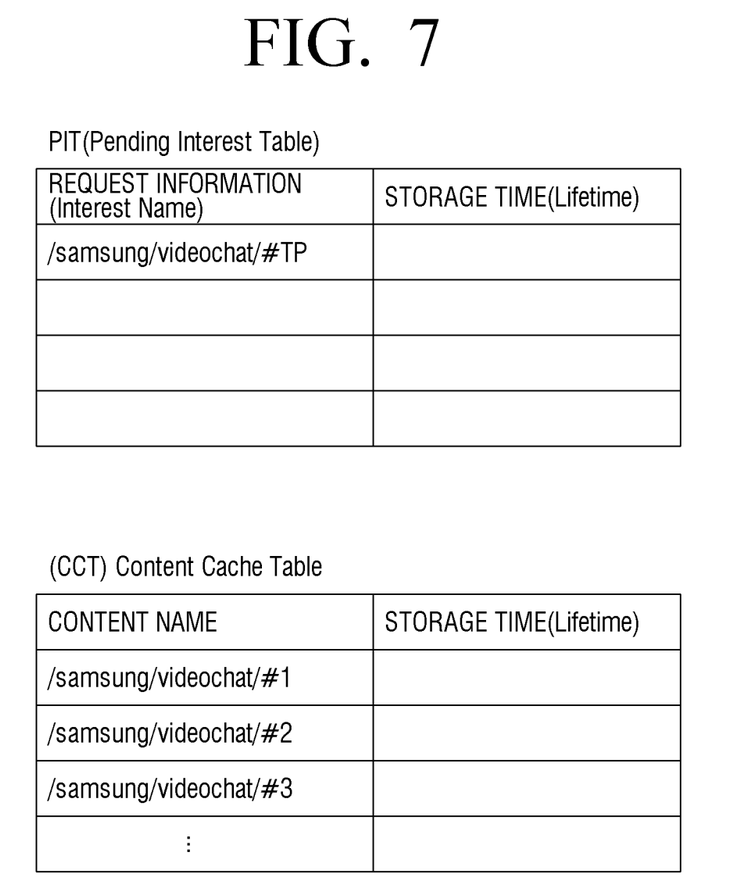
FIG. 7 is a view provided to explain a specific example of request information according to an exemplary embodiment.

FIG. 7 is a view which explains a specific example of request information, according to an exemplary embodiment.

A CCN-based video conversation system transmits contents by packet. However, request information may be stored in a PIT by a packet group comprising a plurality of packets rather than a packet. That is, a target device which generates request information may generate and transmit request information regarding real-time contents by packet groups rather than by individual packets.

In response to a target device generating request information by packet group and transmitting the request information to a source device through a router, the source device may transmit to the target device packets which are continuously generated on a real-time basis according to the received request information by packet group.

Accordingly, as illustrated in FIG. 7, a PIT may store request information (/samsung/videochat/#TP) by packet group including a plurality of packets (/samsung/videochat/#1, /samsung/videochat/#2, . . . ), and a (CCT) may sequentially store a plurality of packets included in a packet group.

Meanwhile, a PIT may automatically delete request information by packet group in the PIT in response to transmission of contents by packet from a source device being suspended for more than a predetermined period of time.

That is, by transmitting, only once, request information including a plurality of packets, real-time contents may be continuously received and accordingly, overhead and degradation of performance on a network may be prevented. In addition, limited PIT resources may be effectively utilized.

Figure 8:
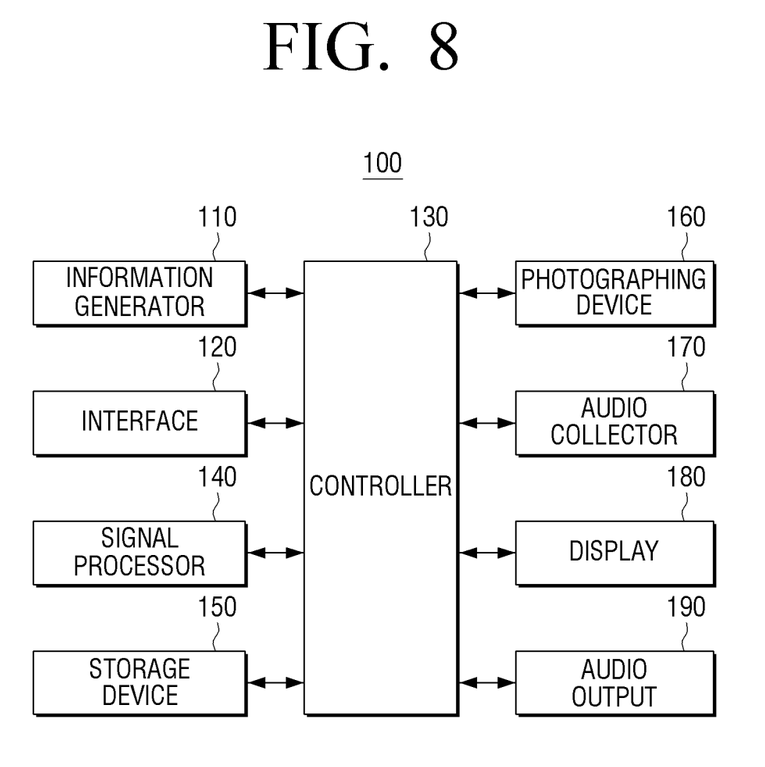
FIG. 8 is a block diagram illustrating a specific configuration of a terminal device according to an exemplary embodiment.

FIG. 8 is a block diagram illustrating a specific configuration of a terminal device, according to an exemplary embodiment. In FIG. 2, only a case where the terminal device 100 operates as a source device has been explained. However, each terminal device 100-1, 100-2, 100-3 on a network may operate both as a source device and as a target device. Accordingly, the terminal device 100 may further comprise a signal processor 140, a storage device 150, a photographing device 160, a audio collector 170, a display 180, and a audio output 190, in addition to the configuration illustrated in FIG. 2.

The information generator 110 may generate request information which requests real-time contents, in addition to identification information. That is, when receiving identification information from another terminal device, the information generator 110 may generate request information based on the received identification information.

The signal processor 140 performs signal processing to output or transmit video and audio data respectively generated on a network by the photographing device 160 and the audio collector 170. Specifically, the signal processor 140 may generate real-time contents by packet by performing signal processing such as scaling, encoding, multiplexing, and etc. with respect to video and audio data. In addition, the signal processor 140 may perform signal processing with respect to video and audio data so that they may respectively output through the display 180 and the audio output 190.

Further, the signal processor 140 may restore image data and audio auto by performing signal processing such as de-multiplexing, decoding, up-scaling, and etc. with respect to real-time contents received from another terminal device.

The storage device 150 may store video and audio data generated by the photographing device 160 and the audio collector 170, respectively. In addition, the storage device 150 may store identification and request information generated by the information generator 110.

The photographing device 160 photographs a user. Specifically, the photographing device 160 may photograph a user and may generate real-time image data. To do so, the photographing device 180 may be implemented as a camera. The photographing device 180 may be mounted inside the terminal device 100, or may be implemented as an external apparatus which is connected to the terminal device, via a cable or may be wirelessly connected to the terminal device.

The audio collector 170 collects a user voice. That is, the audio collector 170 may collect a user voice and may generate real-time audio data. For example, the audio collector 170 may be implemented as a microphone to collect a user voice which is to be integrally mounted inside the terminal device 100 or implemented to be provided separately from the terminal 100.

The display 180 provides a user with a display screen. Specifically, the display 180 may display image data which is signal-processed by the signal processor 140. In response to there being a plurality of users who participate in a video conversation, the display 180 may provide screens which are divided according to a predetermined UI. The display may be implemented as a Liquid Crystal Display (LCD), Organic Light Emitting Display (OLED) or Plasma Display Panel (PDP), and may provide various display screens which can be provided through the terminal device 100.

The audio output 140 outputs audio data which is signal-processed by the signal processor 140. To do so, the audio output 140 may be implemented as an output port such as a speaker or as an output jack.

Figure 9:
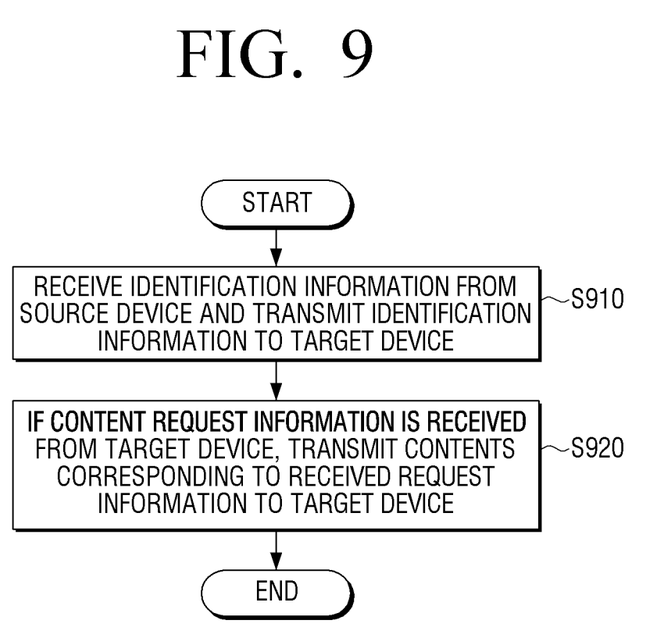
FIG. 9 is a flowchart which explains a method of controlling a router, according to an exemplary embodiment.

FIG. 9 is a flowchart which explains a method for controlling a router, according to an exemplary embodiment.

In FIG. 9, identification information is received from a source device and is transmitted to a target device (S910). Specifically, identification information regarding real-time data which a target device will receive from a source device, may be received from a source device and transmitted to the target device. Herein, the identification information may include at least one of source device identification information, service identification information, target device identification information, group name and content name.

In response to content request information which is generated based on identification information is received from a target device, contents which correspond to the received request information is transmitted to the target device (S920). The request information may include source device identification information, group name and content name.

In response to the request information being information to identify a packet group including a plurality packets, the step of transmitting to the request information to the target device contents which correspond (S920) may comprise transmitting a plurality of packets included in a packet group which is identified by the request information to the target device.

Meanwhile, in response to request information being received, the step of confirming whether contents which correspond to the request information are stored may be further included. If the contents which correspond to the request information are stored, the step of transmitting to a target device (S920) the contents which correspond to the request information may comprise transmitting the stored contents to the target device.

In response to the contents which correspond to the request information not being stored, the step of transmitting the contents which correspond to the target device (S920) may comprise transmitting the received request information to the source device, receiving the contents which correspond to the request information from the source device, and transmitting to the target device the received contents.

The identification information and the request information may be respectively broadcast from the source device and the target device, and the real-time contents may be video conversation contents.

Figure 10:
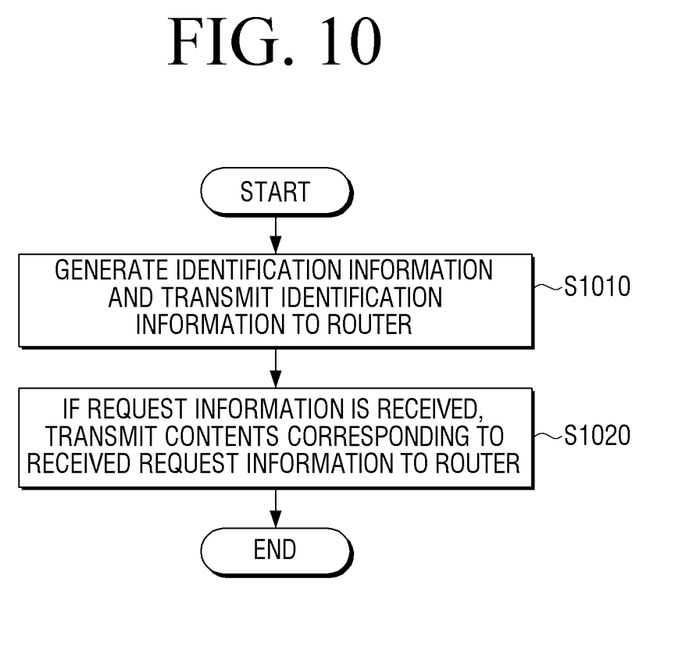
FIG. 10 is a flowchart which explains a method of controlling a source device according to an exemplary embodiment.

FIG. 10 is a flowchart which explains a method for controlling a source device, according to an exemplary embodiment.

Identification information regarding real-time data that a target device will receive is generated and transmitted to a router (S1010). Herein, the identification information may include at least one of source device identification information, service identification information, target device identification information, group name and content name.

In response to request information for requesting data being received from a router, data which corresponds to the received request information is transmitted to the router (S 1020). The request information may include source device identification information, group name and content name.

In response to the request information being information which identifies a packet group including a plurality of packets, the step of transmitting to the router (S920) contents which correspond to the request information may include transmitting a plurality of packets included in a packet group which is identified by the request information.

The identification information and the request information may be broadcast from the source device and the target device, respectively, and the real-time contents may be video conversation contents.

The terminal device and the method of controlling a router according to the various exemplary embodiments may be implemented as a program which is executable in a router, and such a program may be stored and used in various types of recording media.

Specifically, a program code for performing the above-mentioned methods may be stored in various types of non-volatile recording medium, such as flash memory, Read Only Memory (ROM), Erasable Programmable ROM (EPROM), Electronically Erasable and Programmable ROM (EE-PROM), hard disk, removable disk, memory card, USB memory, and CD-ROM.

The foregoing embodiments and advantages are merely exemplary and are not to be construed as limiting the present invention. The teachings of the exemplary embodiments can be readily applied to other types of apparatuses. Also, the description of the exemplary embodiments of the inventive concept is intended to be illustrative, and not to limit the scope of the claims, and many alternatives, modifications, and variations will be apparent to those skilled in the art.

What is claimed is:

1. A method of controlling a router to transmit Content-Centric Network (CCN)-based real-time contents, the method comprising:
   receiving from a source device identification information regarding real-time contents that a target device is to receive and transmitting the real-time contents to the target device; and
   in response to content request information which is generated based on the identification information being received from the target device, transmitting to the target device contents which correspond to the received request information,
   wherein the identification information includes at least one of source device identification information, service identification information, target device identification information and content name, and
   wherein the request information includes the source device identification information, the group name and the content name.

2. The method of claim 1, wherein, in response to the request information being information which identifies a packet group including a plurality of packets, the transmitting to the target device contents which correspond to the request information comprises transmitting to the target device a plurality of packets included in a packet group which is identified by the request information.

3. The method of claim 1, further comprising:
in response to the request information being received, confirming whether contents which correspond to the request information are stored,
wherein the transmitting to the target device contents which corresponds to the request information comprises, in response to contents which correspond to the request information being stored, transmitting the stored contents to the target device.

4. The method of claim 1, further comprising:
in response to the request information being received, confirming whether contents which correspond to the request information are stored,
wherein the transmitting to the target device contents which correspond to the request information comprises, in response to contents which correspond to the request information are not stored, transmitting the received request information to the source device; and
receiving from the source device contents which correspond to the request information and transmitting the contents to the target device.

5. The method of claim 1, wherein the real-time contents includes video conversation contents.

6. A method of controlling a source device to transmit Content-Centric Network (CCN)-based real-time contents, the method comprising:
generating identification information regarding real-time contents that a target device is to receive from the source device and transmitting the real-time contents to a router; and
in response to content request information which is generated based on the identification information being received from the router, transmitting to the target device contents which correspond to the received request information,
wherein the identification information includes at least one of source device identification information, service identification information, target device identification information and content name, and
wherein the request information includes the source device identification information, the group name and the content name.

7. The method of claim 6, wherein, in response to the request information being information which identifies a packet group including a plurality of packets, the transmitting to the router contents which correspond to the request information comprises transmitting to the router a plurality of packets included in a packet group which is identified by the request information.

8. The method of claim 6, wherein the identification information and the request information are respectively broadcast from the source device and the target device.

9. A router for transmitting CCN-based real-time contents, the router comprising:
an interface which communicates with a device; and
a controller which receives identification information regarding real-time contents that a target device is to receive from a source device and transmits the received identification information to the target device, and in response to the request information which requests the real-time contents being received from the target device, controls the interface to transmit to the target device contents which correspond to the received request information,
wherein the identification information includes at least one of source device identification information, service identification information, target device identification information and content name, and
wherein the request information includes the source device identification information, the group name and the content name.

10. The router of claim 9, wherein in response to the request information being information which identifies a packet group including a plurality of packets, the controller transmits to the target device a plurality of packets included in a packet group which is identified by the request information.

11. The router of claim 9, wherein in response to the request information being received, the controller confirms whether contents which correspond to the request information are stored, and in response to contents which correspond to the request information being stored, the controller transmits the stored contents to the target device.

12. The router of claim 9, wherein in response to the request information being received, confirms whether contents which correspond to the request information are stored, and in response to contents which correspond to the request information not being stored, the controller transmits the received request information to the source device, receives contents which correspond to the request information from the source device, and transmits the contents to the target device.

13. The router of claim 9, wherein the identification information and the request information are respectively broadcast from the source device and the target device.

14. A source device for transmitting CCN-based real-time contents, comprising:
an interface which communicates with a router;
an identification information generator which generates identification information in order to identify real-time contents that a target device is to receive; and
a controller which transmits the generated identification information to the router, and in response to request information which requests contents being received from the router, the controller transmits contents to the interface which correspond to the received request information,
wherein the identification information includes at least one of source device identification information, service identification information, target device identification information and content name, and
wherein the request information includes the source device identification information, the group name and the content name.

15. The source device of claim 14, wherein in response to the request information being information which identifies a packet group including a plurality of packets, the controller transmits to the router a plurality of packets included in a packet group which is identified by the request information.

16. The source device of claim 14, wherein the real-time contents are video conversation contents.

17. A system for transmitting CCN-based real-time contents, the system comprising:
a router configured for communication with an interface and a target device;
the router including a controller which receives through an interface a request including identification information from a source device and transmits the identification information to the target device; and the router is further configured to receive a request for content information from the target device, to receive the required content information, and to control the interface to transmit the received content information to the target device, wherein the identification information includes at least one of source device identification information, service identification information. target device identification information and content name, and wherein the request information includes the source device identification information, the group name and the content name.

18. The system of claim 17 wherein the received content information includes real-time contents.

19. The system of claim 17, wherein the received content information is stored in a storage device in the router.

* * * * *